United States Patent [19]

Baumann

[11] 4,117,357
[45] Sep. 26, 1978

[54] FLEXIBLE COUPLING FOR ROTOR ELEMENTS OF A SUPERCONDUCTING GENERATOR

[75] Inventor: Kai J. Baumann, Pittsburgh, Pa.

[73] Assignee: Electric Power Research Institute, Inc., Palo Alto, Calif.

[21] Appl. No.: 787,805

[22] Filed: Apr. 15, 1977

[51] Int. Cl.[2] .............................................. H02K 9/00
[52] U.S. Cl. ...................................... 310/52; 310/261
[58] Field of Search ................... 310/10, 54, 40, 165, 310/52, 261, 265; 64/15 B; 285/187, DIG. 5; 220/15

[56] References Cited

U.S. PATENT DOCUMENTS

| | | | |
|---|---|---|---|
| 2,706,260 | 4/1955 | Heintz | 310/54 |
| 3,698,200 | 10/1972 | Johnson | 62/45 |
| 3,813,898 | 6/1974 | Hatch | 64/15 R |
| 3,942,053 | 3/1976 | Abolins | 310/10 |
| 3,956,648 | 5/1976 | Kirtley | 310/10 |
| 4,017,755 | 4/1977 | Litz | 310/52 |
| 4,018,059 | 4/1977 | Hatch | 310/54 |
| 4,042,846 | 8/1977 | Sterrett | 310/52 |

Primary Examiner—R. Skudy
Attorney, Agent, or Firm—Townsend and Townsend

[57] ABSTRACT

A flexible coupling for connecting pairs of concentric rotor elements in the rotor of a superconducting generator. Various combinations of flexible couplings, each of which is disposed normally to the rotor axis, are used at one or both ends of the superconducting rotor to connect the inner and outer rotors and to connect the inner rotor to a concentric insulating shield. The flexible coupling utilizes a relatively thin ring. When used to connect the inner rotor to the insulating shield the ring may be constructed of a material that retains flexibility at temperatures down to at least about 100° K. The ring may be laminated to increase flexibility and may be made up of joined segmental portions. Securing devices are annularly distributed about the ring. The securing devices are spaced apart a sufficient distance to permit deflections of the ring in an axial direction. The rings are dimensioned to provide radially and torsionally rigid connections between the rotor elements, maintaining their concentricity, while permitting relative axial movements between the rotor elements to accommodate relative thermal contractions and expansions of the rotor elements during cool-down and warm-up of the superconducting rotor.

20 Claims, 8 Drawing Figures

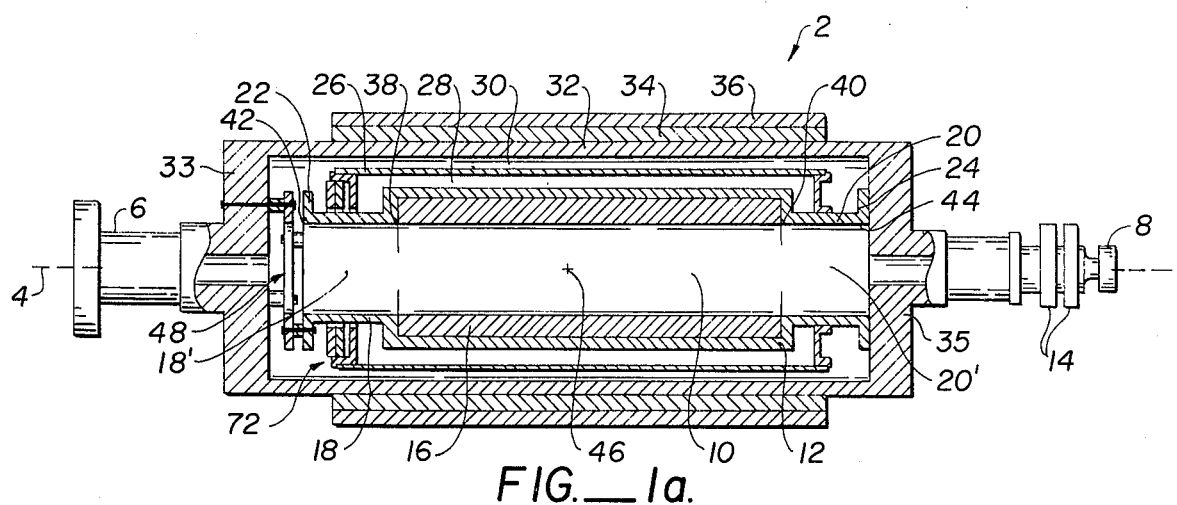
FIG._1a.
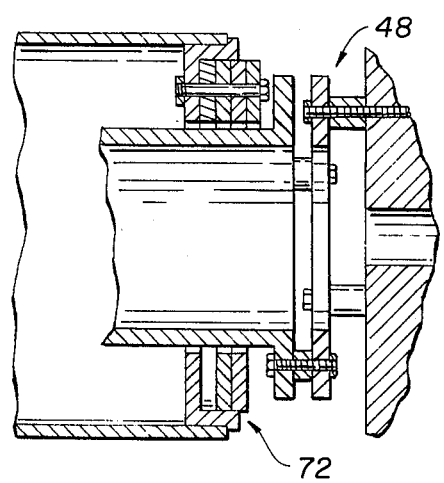
FIG._1b.
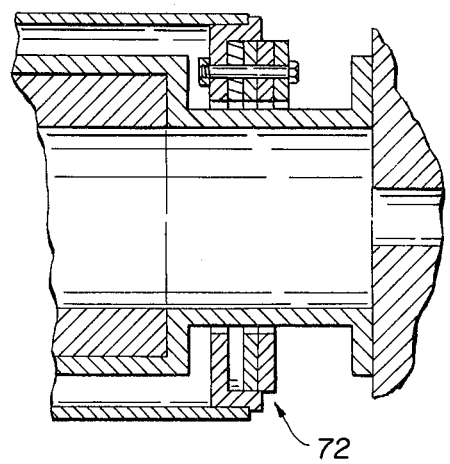
FIG._1c.
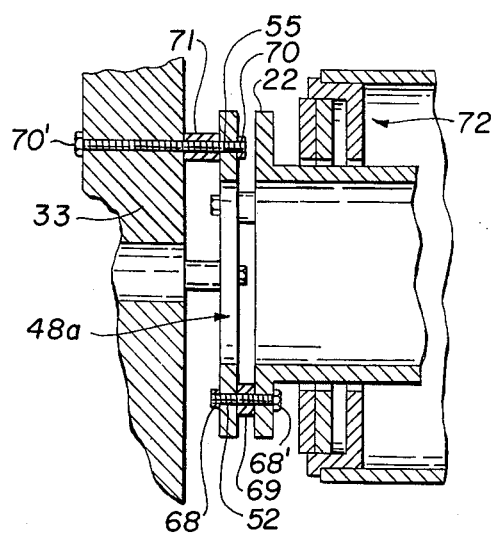
FIG._1d.
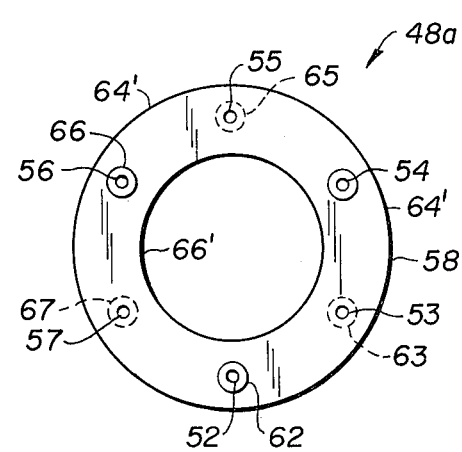
FIG._2.

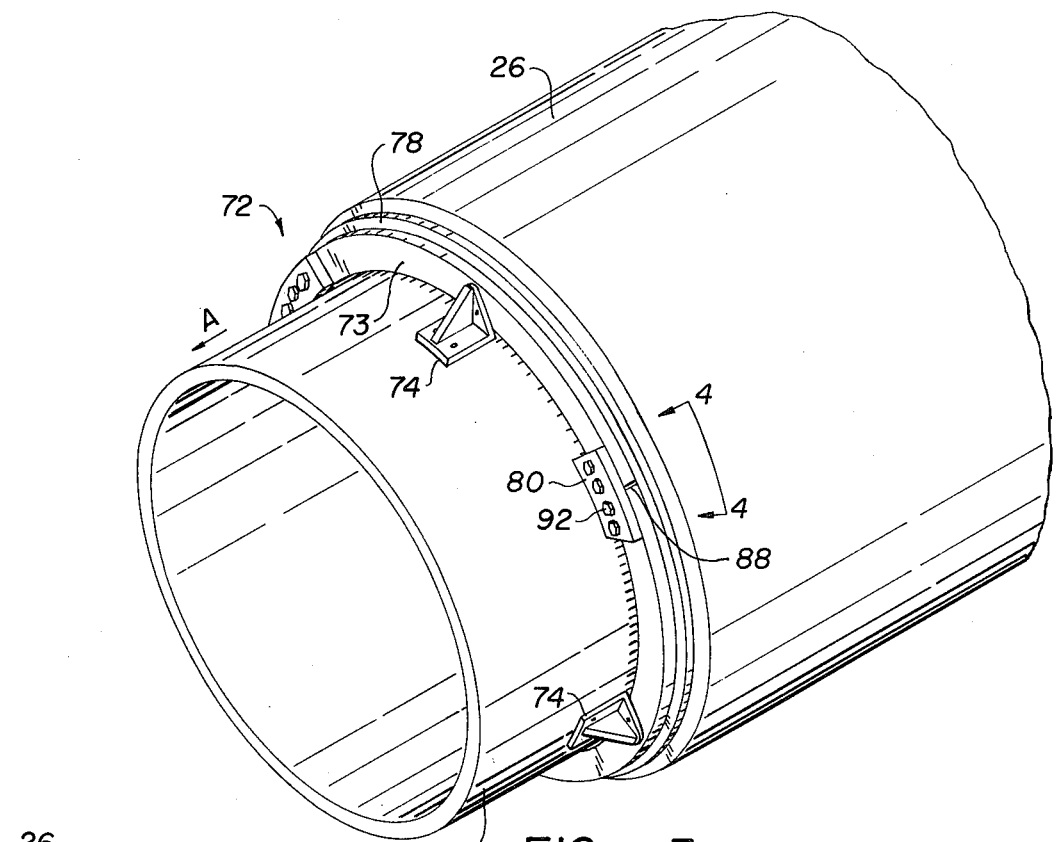
FIG._3.
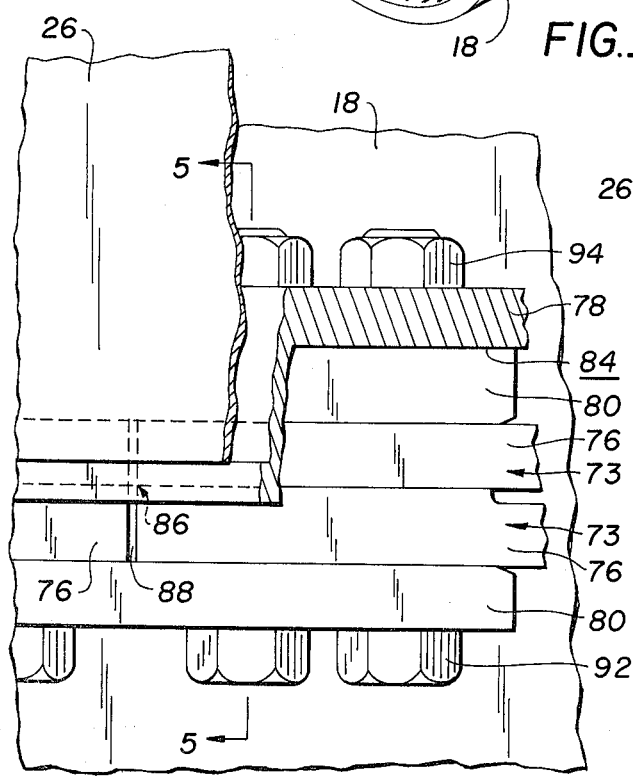
FIG._4.
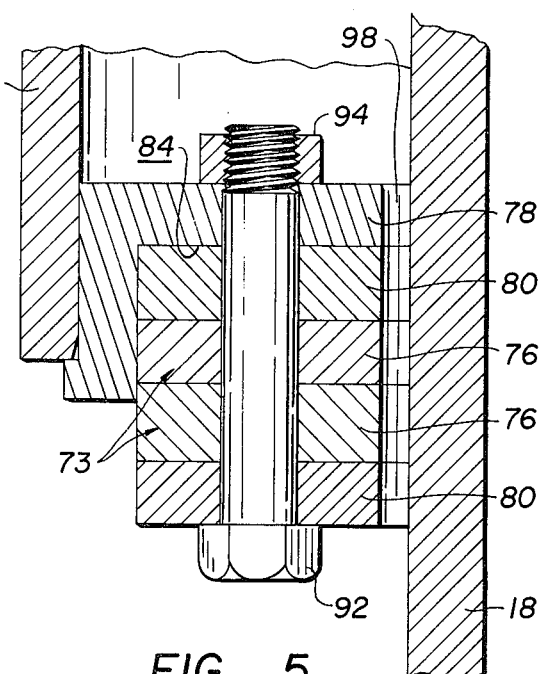
FIG._5.

FLEXIBLE COUPLING FOR ROTOR ELEMENTS OF A SUPERCONDUCTING GENERATOR

ACKNOWLEDGEMENT

This invention was made under contract with or supported by the ELECTRIC POWER RESEARCH INSTITUTE, INC. of Palo Alto, California.

BACKGROUND OF THE INVENTION

It is a well-known phenomenon that many metals, alloys and chemical compounds substantially lose all of their electrical resistance and become superconductive at temperatures near absolute zero. This phenomenon is advantageously employed in electrical alternators or generators by cooling the rotor of the generator to a sufficiently low temperature. By operating a generator in its superconducting state, losses in the windings of the rotor are substantially eliminated and the generator efficiency is correspondingly increased. Additionally, the generator rotors and stators can be built to a much smaller dimension. This results in a reduction in weight of the generator. Moreover, when the rotor is smaller, there is a resultant reduction in operating problems such as vibrations, high material stresses and the like frequently encountered in high-speed rotors.

In general, superconducting rotors consist of a number of cylindrical concentric elements. On the outside there is a damper shield and a damper shield support which are supported by an outer rotor. Inside the outer rotor is an inner rotor including superconducting field windings or coils immersed in a helium refrigerated annulus. This helium refrigerated annulus typically maintains the temperature of the superconducting coils at 4.3° K. or below so that superconductivity takes place. Intermediate the two rotors and concentric therewith, is a thermal radiation or insulating shield, designed to minimize radiant heating of the cold inner rotor. The term "rotor" will be used to refer to the inner rotor, the outer rotor, and the insulating shield.

An inherent problem in the design of superconducting generators is the accommodation of the relatively large thermal deflections between the cold inner rotor and the relatively warm outer rotor and between the cold inner rotor and the insulating shield. The present invention accommodates these differential axial thermal expansions and contractions.

The outer damper shield and damper shield support serve two functions. First, they comprise the strongback outer thermal jacket of the super-cooled rotor. Second, they prevent back electromotive forces from the stator from penetrating to the superconducting coils. If penetration to the superconducting coils of the back electromotive forces occurs, the coils of the windings become heated. When they become heated above a critical temperature, they lose their superconductivity and the designed field is lost.

During normal operation, the inner rotor is first subjected to "cool-down". In cool-down, liquified helium is introduced into the vicinity of the superconducting coils. The inner rotor undergoes substantial thermal contraction in an axial direction. Taking the case of a superconducting rotor 132 inches long, a thermal contraction of 3/10 of an inch or more can occur. In a longer superconducting rotor on the order of 275 inches long, thermal contractions of as much as 7/10 of an inch or more can occur. Simultaneously, the insulating shield, which will be cooled to an intermediate temperature of about 100° K., contracts axially, but normally in an amount less than that of the inner rotor.

At the same time this axial shrinkage is accommodated, any tendency of the inner rotor to move rotationally with respect to the outer rotor must be prevented. Otherwise, this relative movement between inner and outer rotors will generate undesired back electromotive heating of the superconducting coils and can result in the loss of their superconductivity.

Further, any tendency of the rotors to move out of concentric alignment must be avoided. Even a minute eccentricity of the rotors may result in substantial resonances and unbalanced forces during high-speed rotation. Therefore, the connection must have sufficient lateral (radial) stiffness and strength to maintain the rotors in concentric alignment.

In addition, the regions between the rotor elements are in a vacuum which adversely affects the operation of a sliding coupling. At low vacuum temperatures and at high rates of rotation, a rapid "fretting corrosion" of the sliding parts normally occurs. Also, in a vacuum, rubbing surfaces frequently gall and seize or weld.

In the past, it has been proposed to connect the rotor elements rigidly both axially and torsionally. However, this design leads to excessive axial stresses in large generators.

Prior art patents do not address themselves to the particular needs of a coupling between the rotors of a superconducting generator. There are, however, a number of prior art patents which disclose a variety of couplings designed to connect misaligned shafts in end-to-end relation. Typical of these are U.S. Pat. Nos. 3,798,924, 3,874,195, 3,759,064, 3,703,817, 1,947,052, and 3,405,760. None of the couplings disclosed in these patents is adapted to solve the problems encountered when connecting concentric structures of a superconducting rotor.

In general, the couplings disclosed in these patents provide a driving connection only between the shafts since the shafts are supported by independent bearings on each side of the coupling. These couplings are well adapted to accommodate misalignments between rotating shafts. However, they are generally incapable of accommodating appreciable axial movement between the shafts, particularly at the low temperatures encountered in super-cooled generators and they are even less capable of radially supporting a pair of shafts, especially when the weight of the rotary element is as large as that of the rotor of a generator.

SUMMARY OF THE INVENTION

The present invention provides a flexible coupling for connecting pairs of concentric elements in a superconducting rotor. The coupling is preferably constructed of a relatively thin ring and its provides the sole support between the rotors at one or both ends of the superconducting rotor. When used to connect the inner rotor to the insulating shield, the ring is constructed of a material that retains flexibility at temperatures down to at least about 100° K. The ring may be laminated to increase its flexibility and may comprise a number of joined ring segments. Spaced apart securing devices alternately affix the ring to the rotors which it connects. The spacing between the securing devices is sufficient to permit deflections of the ring in an axial direction.

Thus, the flexible coupling of the present invention provides a radially and torsionally rigid connection between pairs of concentric elements in a superconducting rotor. The coupling prevents vibrations, can withstand short-circuit torques, and permits relative axial movements between the rotors caused by thermal contractions and expansions thereof during cool-down and warm-up. The coupling of the present invention maintains the rotors in concentric alignment.

An improved superconducting rotor design is also provided which is capable of accommodating large relative axial deflections between the cold inner rotor and (1) the relatively warm outer rotor, and/or (2) the insulating shield.

BRIEF DESCRIPTION OF THE DRAWINGS

FIG. 1a is a side-elevation section taken along the axis of a superconducting rotor constructed in accordance with the present invention and illustrates the connection between the concentric rotors;

FIG. 1b is an enlarged, fragmentary view, in section, of the right end of the superconducting rotor of FIG. 1a, and shows another embodiment of the invention;

FIG. 1c is an enlarged, fragmentary view, in section, of the right end of the superconducting rotor shown in FIG. 1a, and shows a further embodiment of the invention;

FIG. 1d is an enlarged fragmentary view, in section of the left-end of the superconducting rotor shown in FIG. 1a, showing the connection between the inner and outer rotors in detail;

FIG. 2 is a plan view of a flexible coupling ring constructed according to the present invention;

FIG. 3 is an isometric view of a coupling constructed according to the invention connecting the inner rotor and the insulating shield;

FIG. 4 is a side-elevation, with parts broken away, taken along lines 4—4 of FIG. 3; and FIG. 5 is a sectional view taken along lines 5—5 of FIG. 4.

DESCRIPTION OF THE PREFERRED EMBODIMENTS

Referring to FIG. 1a, a rotor 2 is disposed within a stator (not shown), and is driven by a stub shaft 6 and has at its end opposite the stub shaft a cryogenic transfer system 8. Rotor 2 revolves at high speed about its axis 4 to generate electricity in windings disposed in the stator.

Cryogenic transfer system 8 transfers liquid helium to and from the interior core space 10 of an inner rotor 12. This system is fully described in an article entitled, "A Relatively Rotatable Cryogenic Transfer System", dated July 13, 1972, in a technical publication available at the Massachusetts Institute of Technology, marked MT-125J. In addition to and adjacent transfer system 8, rotor 2 includes conventional collector rings 14 which transfer current to super-cooled field windings 16 disposed in inner rotor 12.

Inner rotor 12 includes torque tubes 18 and 20 which are disposed at respective ends of the inner rotor 12. Torque tube 18 has a flange 22 and torque tube 20 has a flange 24.

Surrounding inner rotor 12 and concentric therewith is a cylindrical insulating shield 26. The insulating shield minimizes the radiant heating of cold inner rotor 12 by the warmer outer rotor 32. An annulus 28 which surrounds inner rotor 12 and an annulus 30 which surrounds insulating shield 26 are maintained in a vacuum state during operation of the generator.

Surrounding insulating shield 26 is an outer rotor 32 which is co-axial with axis 4. A damper shield 34 is juxtaposed between and it is supported by outer rotor 32 on its inner side and by a damper support 36 on its outer side.

During operation of the generator, space 10 of rotor 12 and field windings 16 are cooled down to a temperature of approximately 4.3° K. Field windings 16 thus become superconducting. Insulating shield 26 is cooled to a temperature of about 100° K. Torque tubes 18 and 20 exhibit a temperature gradient along their axial lengths. For example, during operation, points 38 and 40 of the torque tubes are at approximately the same temperature as field windings 16. Points 42 and 44 are at approximately room temperature. Between points 38 and 42 and between 40 and 44 on the respective torque tubes, the temperature rises from about 4° K. to room temperature moving axially outward from points on the torque tubes closest to intermediate point 46. To effect the described temperature gradient the interiors 18' and 20' of torque tubes 18 and 20 are thermally insulated from space 10 by providing thermally insulating barriers at each end of space 10 (not shown in the drawings). The exact proportions of the superconducting rotor elements and the couplings and the design of the cooling apparatus within inner rotor 12 are not shown. Outer rotor 32 is at room temperature or above (300° K. plus).

Thus, in general, it can be said that during "cool down" inner rotor 12 and insulating shield 26 undergo axial thermal contraction and since the former contracts more than the latter, there is also a relative thermal contraction between the two. Outer rotor 32 does not undergo thermal contraction although it may expand relative to the axis if it becomes heated above room temperature during operation.

Referring to FIGS. 1a-2, the present invention provides a flexible coupling 48 for connecting flange 22 of inner rotor 12 to an end wall 33 of outer rotor 32. Coupling 48 preferably includes a ring 48a, best shown in FIG. 2, having spaced apart apertures 52-57 located intermediate an outer periphery 64' and an inner diameter 66' of the ring.

Referring to FIG. 1d, coupling 48 includes means, such as bolt sets, each of which consists of a bolt 68, a spacer 69, and a nut 68'. Three equally spaced bolt sets secure ring 48a to flange 22 of inner rotor 12, and three equally spaced bolt sets secure rings 48a to end wall 33 of outer rotor 32. Spacers 69 and 71, space ring 48a from flange 22 and end wall 33, respectively. Bolts 68 and 70 are secured by nuts 68' and 70'. In this manner, end wall 33 of outer rotor 32 is secured to ring 48a at three spaced points around the latter and inner rotor 12 is secured at alternative points about ring 48a midway between the outer rotor attachments.

Axial deflection between the inner and outer rotors is accommodated by out-of-plane bending of ring 48a which causes a wave-like deformation of the ring while the concentricity of the inner and outer rotors is maintained.

Instead of employing nuts to secure the bolts to ring 48a, the ring can be provided with bosses 62-67 that surround the ring apertures and the apertures can be threaded for direct engagement by the bolts to eliminate the need for the spacers and separate nuts. The bosses additionally strengthen the ring at the points where the greatest stresses occur.

The ring can be constructed of multiple laminations to enhance its axial deformability. Alternatively, a series of overlying, separate rings can be employed.

Coupling 48 must maintain inner rotor 12 and outer rotor 32 torsionally rigid during operation, that is, it must prevent relative angular movements between the inner and the outer rotors. Otherwise, undesired back electromotive heating can cause a temperature rise in the superconducting coils which in turn can lead to a loss of superconductivity. Additionally, coupling 48 must be radially rigid, that is, it must maintain the concentricity of the inner and outer rotors to avoid vibrations.

For coupling 48 to have these characteristics, ring 48a must have an axial thickness and a radial width which assure the necessary torsional and radial rigidity, while at the same time ring 48a must retain the ability to deform out of the ring plane to accommodate relative axial contractions between the rotors. An axial thickness of about 0.3 to 0.4 inch and radial width of about 4 inches for a ring having an outside diameter of about 25 inches and constructed of titanium accommodates axial deflections of between 0.4 inch to 0.7 inch. The ring can also be made out of aluminum, aluminum alloy, ferro alloy, titanium alloy, or reinforced composite.

Referring again to FIGS. 1a and 3-5, the present invention also provides a coupling 72 for connecting torque tube 18 of inner rotor 12 to insulating sheild 26. Normally shield 26 operates at approximately 100° K.; however, abnormal conditions can cause larger thermal differences between the insulating shield and the interior of the rotor 10 which is at approximately 4° K. during operation. Therefore, insulating shield 26 must be attached in such a way that axial and radial expansions thereof resulting from temperature differentials of up to 350° K. can be accommodated. Coupling 72 must also be capable of transmitting some torque and it must be radially rigid to avoid vibrations.

FIGS. 1a, 1d, 3, 4, and 5 show the construction of coupling 72. A plurality of, e.g., two rings 73, each constructed of three 120° ring segments 76 are secured to torque tube 18 with three right-angle brackets 74 each of which is attached, e.g., bolted to one of the ring segments 76. The brackets are further secured, e.g., bolted to the outer surface of torque tube 18. A rigid, generally L-shaped, circular flange 78 is shrunk fit into the end of shield 26. The flange defines a flat end-face 84.

Three pairs of lap plates 80 secure the ends of ring segments 76 to each other and secure rings 73 to the flat end face 84 of flange 78. It will be observed that a narrow gap 88 may be formed between each pair of adjoining ring segments 76, each set of aligned gaps may form a channel 86 between the inner and the outer lap plates, as best illustrated in FIG. 4. Bolts 92 and nuts 94 tighten the lap plates 80 and the ring segments 76 against each other and against face 84 of flange 78.

The laminated structure of the ring of coupling 72 yields greater flexibility and facilitates the accommodation of axial and radial expansions and contractions of insulating shield 26 with respect to inner rotor 12. Rings 73 of coupling 72 are separated from torque tube 18 by a space 98.

The ring of coupling 72 must have an axial thickness and a radial width so that it has the requisite radial and torsional rigidity and the capability to deform out-of-plane between brackets 74 at operating temperatures between 90°-130° K. to accommodate axial movement of the inner rotor with respect to the insulating shield. For example, in a typical large rotor in which rings 73 have a mean diameter of 22 inches, the rings have a combined axial thickness of 0.6-0.8 inches and a radial width of 1.6 inches when made of steel alloy.

As previously described, torque tube 18 has a temperature gradient in an axial direction so that the temperature increases moving in an axial direction indicated by arrow A. Insulating shield 26 has a length relative to inner rotor 12 so that coupling 72 is secured to torque tube 18 at a position where the normal operating temperature is between 90°-130° K.

For the actual construction of a superconducting rotor, the above described flexible couplings can be employed in several combinations depending on the size of the generator, the operating temperature, the materials of which the rotor is constructed and the like. In the embodiment shown in FIG. 1A, flexible couplings 48 and 72 are employed at one end of the rotor while the inner and outer rotors and the insulating shield are rigidly secured to each other at the other end. It should be noted, however, that couplings 48 and 72 are the only structures which hold the inner and outer rotors and the insulating shield in concentric alignment at that end of the rotor.

FIGS. 1b and 1c show the use of couplings 48 and 72 and of coupling 72 only, respectively at the right-hand end of the rotors.

In practice, the inner rotor and the insulating shield may be assembled in a pre-stressed state so that couplings 48 and 72 deflect axially out-of-plane. In this manner, the maximum out-of-plane bending of the couplings is limited to almost one-half of what it would otherwise be.

It is to be understood that variations of the present invention will occur to those having skill in the art. For example, it is possible that several flexible couplings can be used in series for larger axial deflections encountered in longer rotors, and that any combination of flexible couplings can be used at one or both ends of the superconducting rotor. Variations of the disclosed flexible coupling for attaching concentric elements in the rotor of a superconducting generator are within the spirit and scope of the present invention.

What is claimed is:
1. A superconducting rotor comprising:
a plurality of elongate concentric rotor elements;
means for cooling the innermost rotor element; and
means for connecting the rotor elements including
means forming the sole support between at least one pair of the rotor elements at at least one end of the superconducting rotor including a ring, first means annularly spaced about the ring for securing the ring to one rotor element of the one pair, and second means spaced between the first means for securing the ring to the other rotor element of the one pair, the ring having an axial thickness sufficiently large with respect to the radial width thereof so that the ring forms a radially and torsionally rigid connection while permitting its out of plane deflection, whereby during operation of the superconducting rotor relative axial movements of the rotor elements of the one pair due to thermal contractions and expansions thereof are accommodated by the ring and the concentricity of the rotor elements of the one pair is maintained.

2. A superconducting rotor according to claim 1 and wherein the ring comprises a plurality of overlying flat, ring-shaped members.

3. The invention of claim 2 and wherein each ring-shaped member is comprised of a plurality of segmental ring portions which are positioned in end-to-end relation.

4. The invention of claim 3 and wherein the ends of the adjacent segmental ring portions of each ring-shaped member are spaced apart to form a plurality of gaps in the ring-shaped member.

5. The invention of claim 4 and wherein the segmental ring portions are oriented so that the gaps in each member are in corresponding alignment with the gaps in the other members to define a ring with a plurality of continuous channels therethrough.

6. The invention of claim 1 wherein the ring has an axial thickness in the range of 0.3 to 0.4 inches, and a radial width of about 4 inches.

7. A superconducting rotor for high-speed rotation about an axis relative to a stator, the rotor comprising:
an outer rotor;
an inner rotor coaxially disposed within the outer rotor;
means for cooling the inner rotor;
an insulating shield coaxially disposed intermediate the inner and outer rotors for thermally insulating the inner rotor from the outer rotor;
first means concentrically connecting the inner and outer rotors at the ends thereof including a first ring forming the sole support between the rotors at one end of the superconducting rotor, the first ring configured to permit its out of plane deflection and so that it is relatively stiff in a radial direction and provides a torsionally rigid connection; and
second means concentrically connecting the inner rotor to the insulating shield at the ends thereof including a second ring forming the sole support between the inner rotor and the insulating shield at one end of the superconducting rotor, the second ring configured to permit its out of plane deflection and so that it is relatively stiff in a radial direction and provides a torsionally rigid connection;
whereby relative axial movements of the rotors and the insulating shield due to thermal contractions and expansions thereof are accommodated by the rings.

8. The invention of claim 7 and wherein the inner and outer rotors have opposing corresponding ends, the first connecting means further including a plurality of fastening means, the first ring having a plurality of annularly spaced apertures therethrough which receive the fastening means, and wherein the fastening means are alternately affixed to opposing ends of the inner and outer rotors.

9. The invention of claim 7 and wherein the second ring comprises a plurality of flat, ringshaped members.

10. The invention of claim 9 and wherein each ring-shaped member is comprised of segmental ring portions which are positioned in end-to-end relation.

11. The invention of claim 10 and wherein the ends of the adjacent segmental ring portions of each ring-shaped member are spaced apart to form a plurality of gaps in the ring-shaped member.

12. The invention of claim 11 and wherein the segmental ring portions are oriented so that the gaps in each member are in corresponding alignment with the gaps in the other members and the second ring is formed with a plurality of continuous channels therethrough.

13. The invention of claim 12 and wherein the second connecting means further includes means spaced between the channels for attaching one side of the second ring to the cylindrical surface of the inner rotor disposed perpendicular to the second ring, a plurality of pairs of lap plates, means for holding the pairs of lap plates in clamping relationship about the ring-shaped members so that each pair bridges a channel, and flange means affixed to one end of the insulating shield and to the lap plates on the other side of the second ring.

14. The invention of claim 7 and wherein the first connecting means further includes means for rigidly connecting axially and torsionally the inner and outer rotors at the other end of the superconducting rotor.

15. The invention of claim 7 and wherein the second connecting means further includes a third ring forming the sole support between the inner rotor and the insulating shield at the other end of the superconducting rotor, the third ring having a configuration to permit its out of plane deflection and so that the third ring is relatively stiff in a radial direction and provides a torsionally rigid connection.

16. The invention of claim 14 and wherein the second connecting means further includes means for rigidly attaching axially and torsionally the inner rotor to the insulating shield at the other end of the superconducting rotor.

17. The invention of claim 15 and wherein the first connecting means further includes a fourth ring forming the sole support between the inner and outer rotors at the other end of the superconducting rotor, the fourth ring having a configuration to permit its out of plane deflection and so that the fourth ring is relatively stiff in a radial direction and provides a torsionally rigid connection.

18. A superconducting rotor for high-speed rotation about an axis relative to a stator, the rotor comprising:
an outer rotor having opposing ends;
an inner rotor concentrically disposed within the outer rotor including torque tubes at each end thereof, superconducting elements concentrically disposed internally of the inner rotor, and means for cooling the superconducting elements;
an insulating rotor concentrically disposed between the inner and outer rotors for thermally insulating the inner rotor from the outer rotor;
first means for connecting the inner and outer rotors at the ends thereof maintaining the rotors concentric during high speed rotation of the superconducting rotor, including means for axially and torsionally rigidly attaching the inner and outer rotors at one end of the superconducting rotor, a first ring forming the sole support between the rotors at the other end of the superconducting rotor and having a plurality of annularly spaced apertures therethrough, a plurality of securing means inserted through the apertures and alternately affixed to the outer rotor and the inner rotor, the first ring having dimension to permit out-of-plane bending thereof between the securing means, and to provide a radially and torsionally rigid connection; and
second means for connecting the inner rotor and the insulating rotor at the ends thereof maintaining the rotors concentric during high speed rotation of the superconducting rotor, including second and third rings forming the sole support between the rotors at both ends of the superconducting rotor, the second and third rings having configurations to permit their out of plane bending and so that they are relatively stiff in a radial direction and provide torsionally rigid connections and comprising a plurality of flat, ring-shaped members, each of which is comprised of segmental ring portions which are positioned in end-to-end relation with gaps therebetween and aligned so that the second and third rings have channels therethrough, means for holding the ring-shaped members to each other, the last mentioned means including a plurality of pairs of opposing lap plates which are disposed in clamping relation about the first and second rings with each pair of lap plates bridging a channel, flange means affixed to both ends of the insulating rotor and to the lap plates on one side of the second and third rings for attaching the insulating rotor to the second and third rings, and a plurality of fastening means affixed to the first and second rings and annularly spaced thereabout on the sides of the first and second rings opposite from the flange means for attaching the first and second rings to the torque tubes of the inner rotor; and whereby relative axial movements of the rotors due to thermal contractions and expansions thereof are accommodated by the connecting means and concentricity of the rotors is maintained during high-speed rotation of the superconducting rotor.

19. The invention of claim 18 wherein the first, second and third rings are positioned relative to the inner and outer rotors and the insulating rotor so that the rings are subject to forces acting in an axial direction when the rotors are at room temperature which are opposite to the forces acting on the rings in an axial direction when the rotors are at their respective operating temperatures.

20. A superconducting rotor for high-speed rotation about an axis relative to a stator, the rotor comprising:
an outer elongate rotor;
an inner elongate rotor concentrically disposed within the outer rotor and including superconducting elements concentrically disposed internally of the inner rotor, and means for cooling the superconducting elements;
a shield concentrically disposed between the inner and outer rotors for insulating the inner rotor from the outer rotor;
first means for connecting the inner and outer rotors at the ends thereof including a first ring, first means annularly spaced about the first ring for securing the first ring to one end of the inner rotor, and second means spaced between the first means for securing the first ring to the corresponding end of the outer rotor, the first ring having an axial thickness sufficiently large with respect to the radial width thereof so that the first ring forms a radially and torsionally rigid connection while permitting its out of plane deflection; and
second means for connecting the inner rotor and the shield at the ends thereof including a second ring having a plurality of laminations, a plurality of pairs of lap plates, means for holding the pairs of lap plates in clamping relationship about the laminations, means spaced between the lap plates for attaching one side of the second ring to one end of the inner rotor, and flange means affixed to the corresponding end of the shield and to the lap plates on the other side of the second ring, the second ring having an axial thickness sufficiently large with respect to the radial width thereof so that the second ring forms a radially and torsionally rigid connection while permitting its out of plane deflection;
whereby during the operation of the superconducting rotor relative axial movements of the rotors and the shield due to thermal contractions and expansions thereof are accommodated by the rings and the concentricity of the rotors and the shield is maintained.

* * * * *